US012709272B2

(12) United States Patent
Ogawa

(10) Patent No.: US 12,709,272 B2
(45) Date of Patent: Aug. 18, 2026

(54) VEHICLE DRIVING SUPPORT DEVICE

(71) Applicant: TOYOTA JIDOSHA KABUSHIKI KAISHA, Toyota (JP)

(72) Inventor: Yudai Ogawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/098,021

(22) Filed: Apr. 2, 2025

(65) Prior Publication Data

US 2026/0084698 A1 Mar. 26, 2026

(30) Foreign Application Priority Data

Aug. 20, 2024 (JP) ................................ 2024-139075

(51) Int. Cl.

| | |
|---|---|
| ***B60W 30/14*** | (2006.01) |
| ***B60W 30/182*** | (2020.01) |
| ***B60W 40/09*** | (2012.01) |

(52) U.S. Cl.

CPC ........ *B60W 30/146* (2013.01); *B60W 30/182* (2013.01); *B60W 40/09* (2013.01); *B60W 2520/10* (2013.01)

(58) Field of Classification Search

None

See application file for complete search history.

(56) References Cited

U.S. PATENT DOCUMENTS

| | | | | |
|---|---|---|---|---|
| 6,349,253 | B1 * | 2/2002 | Bellinger | B60W 30/18136 477/115 |
| 6,625,535 | B2 * | 9/2003 | Han | B60T 8/245 701/65 |
| 7,427,254 | B2 * | 9/2008 | Iwatsuki | B60W 10/184 477/92 |
| 7,630,817 | B2 * | 12/2009 | Lock | B60T 7/122 123/352 |
| 8,355,851 | B2 | 1/2013 | Inoue et al. | |
| 8,370,040 | B2 | 2/2013 | Inoue et al. | |
| 8,417,430 | B2 | 4/2013 | Saeki | |
| 8,548,709 | B2 | 10/2013 | Morita | |
| 8,634,939 | B2 * | 1/2014 | Martin | B60W 30/18136 701/72 |

(Continued)

FOREIGN PATENT DOCUMENTS

JP 2023-047151 A 4/2023

*Primary Examiner* — Abdhesh K Jha

(74) *Attorney, Agent, or Firm* — SoraIP, Inc.

(57) ABSTRACT

A driving support ECU for executing constant speed control for controlling a vehicle speed so as to become a set vehicle speed, when the vehicle speed exceeds the set vehicle speed, calculates a target deceleration force for setting the vehicle speed, and controls a deceleration force so that a sum of a power train deceleration force and a service brake deceleration force becomes a target deceleration force. The vehicle driving support device is configured to control a deceleration force so as to be a target deceleration force. The driving support ECU determines an allowance degree of a driver with respect to an increase in an engine rotational speed due to a downshift when a vehicle travels downhill, and controls a ratio according to an allowance degree so that a ratio of a power train deceleration force to a target deceleration force becomes higher as an allowance degree is higher.

5 Claims, 5 Drawing Sheets

(56) References Cited

U.S. PATENT DOCUMENTS

| | | | | |
|---|---|---|---|---|
| 8,768,597 | B2 | 7/2014 | Kagawa | |
| 9,174,643 | B2 | 11/2015 | Aso | |
| 10,017,178 | B2 | 7/2018 | Morimoto et al. | |
| 10,024,419 | B2 * | 7/2018 | Lowndes | F16H 59/02 |
| 10,118,617 | B2 | 11/2018 | Urano et al. | |
| 10,486,698 | B2 | 11/2019 | Masui et al. | |
| 11,124,187 | B2 * | 9/2021 | Simmons | B60W 10/06 |
| 2019/0295419 | A1 | 9/2019 | Tosa et al. | |

* cited by examiner

VEHICLE DRIVING SUPPORT DEVICE

CROSS-REFERENCE TO RELATED APPLICATION

This application claims priority to Japanese Patent Application No. 2024-139075 filed on Aug. 20, 2024. The disclosure of the above-identified application, including the specification, drawings, and claims, is incorporated by reference herein in its entirety.

BACKGROUND

1. Technical Field

The present disclosure relates to a driving support device for a vehicle such as an automobile, and more particularly, to a driving support device that performs constant speed travel control.

2. Description of Related Art

In constant speed travel control, when it is necessary to decelerate a vehicle in order to bring the vehicle speed to a set vehicle speed, a target deceleration force is computed, and control is performed such that the sum of a power train deceleration force and a service brake deceleration force is brought to the target deceleration force. When the target deceleration force cannot be achieved by the power train deceleration force, the deceleration force is increased by increasing the power train deceleration force by a downshift or by generating the service brake deceleration force.

When a downshift is made, the engine rotational speed is increased, and thus vibration and noise are increased. For this reason, there is known a technique of suppressing a downshift in a situation in which a target deceleration force cannot be achieved by a power train deceleration force. For example, Japanese Unexamined Patent Application Publication No. 2023-47151 (JP 2023-47151 A) describes a technique of generating a service brake deceleration force without making a downshift until a predetermined time elapses after a request for a downshift is generated in a situation in which a vehicle travels on a downhill road and the vehicle speed increases (paragraph [0006]).

SUMMARY

In the related art such as the technique described in JP 2023-47151 A, when a predetermined time elapses after a request for a downshift is generated, such as on a downhill road with a long downhill distance, a downshift is always made, and the engine rotational speed is inevitably increased. Therefore, a user that cannot tolerate an increase in vibration or noise due to an increase in the engine rotational speed inevitably feels uncomfortable.

The present disclosure focuses on individual differences in the tolerance to an increase in vibration or noise due to an increase in the engine rotational speed, and provides a driving support device improved so as to be able to vary the ratio of a power train deceleration force to a target deceleration force according to the tolerance of a driver.

According to an aspect of the present disclosure, there is provided a vehicle driving support device (100) including a control unit (driving support electronic control unit (ECU) 10) that executes constant speed control for controlling a vehicle speed (V) such that the vehicle speed is brought to a set vehicle speed (Vset), in which the control unit is configured to compute a target deceleration force for bringing the vehicle speed to the set vehicle speed (S230, S250) when the vehicle speed is more than the set vehicle speed, and to control a deceleration force such that a sum of a power train deceleration force and a service brake deceleration force is brought to the target deceleration force (S260 to S320).

The control unit (driving support ECU 10) is configured to determine tolerance of a driver to an increase in engine rotational speed due to a downshift made when the vehicle travels downhill (S20 to S60), and to control a ratio of the power train deceleration force to the target deceleration force according to the tolerance such that the ratio is higher as the tolerance is higher (S70).

According to the above configuration, the tolerance of the driver to an increase in the engine rotational speed due to a downshift made when the vehicle travels downhill is determined, and the ratio of the power train deceleration force to the target deceleration force is controlled according to the tolerance such that the ratio is higher as the tolerance is higher. Accordingly, it is possible to increase the ratio of the power train deceleration force to the target deceleration force in a situation in which a driver with high tolerance is driving while reducing the possibility that a driver with low tolerance feels uncomfortable with an increase in vibration or noise due to an increase in the engine rotational speed.

ASPECTS OF THE DISCLOSURE

In one aspect of the present disclosure, the control unit (driving support ECU 10) may be configured to calculate a frequency (ratio N/T) of downshifts made by the driver when the vehicle travels downhill without executing the constant speed control, and to determine that the tolerance is high (S20 to S60) when the frequency of the downshifts is equal to or greater than a reference value (α).

As the tolerance of the driver to an increase in the engine rotational speed due to a downshift is higher, the frequency of downshifts made by the driver when the vehicle travels downhill without executing the constant speed control is higher. Accordingly, according to the above aspect, it is possible to determine the tolerance of the driver to an increase in the engine rotational speed due to a downshift based on the frequency of downshifts.

In another aspect of the present disclosure, the control mode for the power train deceleration force may include a plurality of control modes in which the ratio of the power train deceleration force to the target deceleration force is different, and the control unit (driving support ECU 10) may be configured to set, as a basic control mode that is used when the vehicle travels downhill, a control mode with a higher ratio as the frequency of the downshifts is higher (S70, S65).

According to the above aspect, the basic control mode that is used when the vehicle travels downhill can be set to a control mode with a higher ratio of the power train deceleration force to the target deceleration force as the frequency of the downshifts is higher.

In still another aspect of the present disclosure, the control unit (driving support ECU 10) may be configured to: control the power train deceleration force in the control modes in which the ratio of the power train deceleration force to the target deceleration force is different; determine whether a driver tolerates a downshift (S120, S130) when the basic control mode that is used when the vehicle travels downhill is not a control mode with a highest ratio (S80, S90), among the control modes; and change the basic control mode to a control mode with a higher ratio than that in the basic control mode (S170) when it is determined that the driver tolerates a downshift.

According to the above aspect, when the basic control mode that is used when the vehicle travels downhill is not a control mode with the highest ratio, among the control modes, it is possible to determine whether the driver tolerates a downshift. When it is determined that the driver tolerates a downshift, the basic control mode can be changed to a control mode with a higher ratio than that in the basic control mode.

In still another aspect of the present disclosure, the control unit (driving support ECU 10) may be configured to determine whether the driver tolerates a downshift (S120, S130) when it is necessary to supplement the service brake deceleration force (S100) and it is allowed to change the basic control mode to a control mode with a higher ratio than that in the basic control mode (S110).

According to the above aspect, it is possible to suppress determining whether the driver tolerates a downshift when it is not necessary to supplement the service brake deceleration force or it is not allowed to change the basic control mode to a control mode with a higher ratio than that in the basic control mode.

In the above description, in order to help understanding of the present disclosure, the names and/or the reference signs used in the embodiment to be described later are added in parentheses to the components of the disclosure corresponding to the embodiment. However, each constituent element of the present disclosure is not limited to the constituent element of the embodiment corresponding to the name and/or the reference sign attached in parentheses. Other objects, other features and accompanying advantages of the present disclosure will be readily understood from the description of the embodiment of the present disclosure made with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a driving support apparatus according to an embodiment of the present disclosure will be described in detail with reference to the accompanying drawings.

Embodiments

Figure 1:
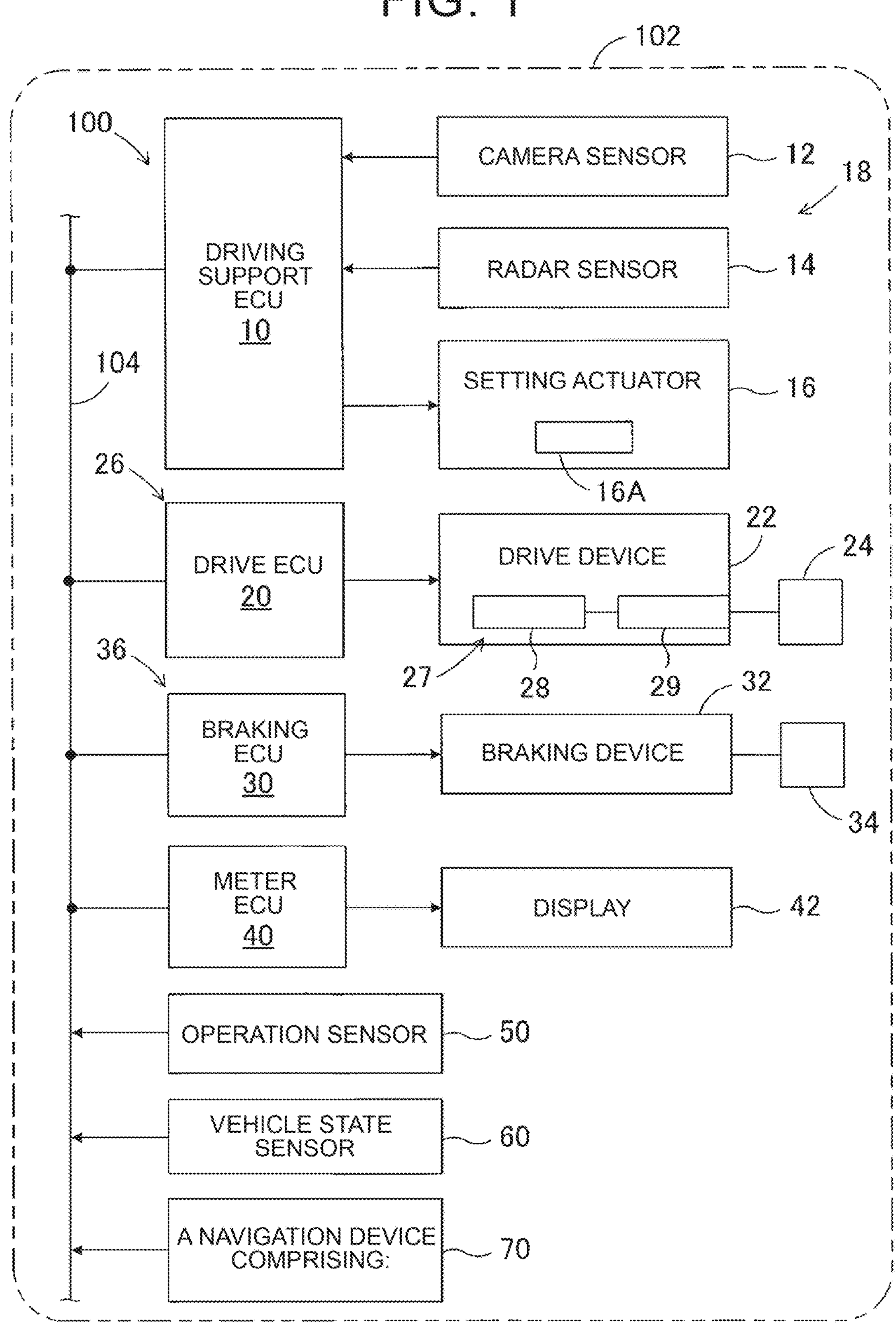
FIG. 1 is a schematic configuration diagram showing an embodiment of a vehicle driving support device according to the present disclosure.

As shown in FIG. 1, a driving support device 100 according to an embodiment of the present disclosure is applied to vehicles 102 and includes a driving support ECU 10. The vehicle 102 is a vehicle capable of autonomous driving, and includes a drive ECU 20, a braking ECU 30, and a meter ECU 40. ECU means an electronic control unit (Electronic Control Unit) including a microcomputer as a main part. The vehicle 102 is referred to as a host vehicle 102 as necessary in order to distinguish it from other vehicles.

A microcomputer of each ECU includes a central processing unit (CPU), a read-only memory (ROM), a random access memory (RAM), a readable and writable non-volatile memory (N/M), an interface (I/F), and the like. The CPU realizes various functions by executing instructions (programs, routines) stored in the ROM. Furthermore, these ECUs are connected to each other in a data-exchangeable manner via a CAN (Controller Area Network 104. Therefore, detected values of sensors (including switches) connected to a specific ECU are transmitted to other ECUs as well.

The driving support ECU 10 is a central control device that performs driving support control such as tracking inter-vehicle distance control and collision avoidance support control. The following inter-vehicle distance control may be referred to as adaptive cruise control (Adaptive Cruise Control), and is abbreviated as "ACC" in the present application. In an embodiment, the driving support ECU 10 cooperates with other ECU to perform the following inter-vehicle distance control, as will be described further below.

ACC includes two controls: constant speed travel control and preceding vehicle follow-up control. The constant speed travel control is a control for adjusting the acceleration/deceleration of the vehicle so that the vehicle speed coincides with the set vehicle speed (target vehicle speed) Vset without requiring a braking/driving operation by the driver. The preceding vehicle following control is a control for causing the preceding vehicle to follow the preceding vehicle while maintaining the inter-vehicle distance between the preceding vehicle traveling immediately before the host vehicle and the host vehicle in the target inter-vehicle distance Dset.

A camera sensor 12, a radar sensor 14, and a setting operation device 16 are connected to the driving support ECU 10. The camera sensor 12 and radar sensor 14 each include a plurality of camera devices and a plurality of radar devices. The camera sensor 12 and the radar sensor 14 function as a target information acquisition device 18 that acquires target information around the vehicle 102.

Each camera device of the camera sensor 12 includes a camera unit that captures an image of the surroundings of the vehicle 102, and a recognition unit that analyzes image data obtained by capturing an image by the camera unit and recognizes a target such as a white line of a road or another vehicle, although not shown in the drawing. The recognition unit supplies information about the recognized target to the driving support ECU 10 at predetermined intervals.

Each radar device of the radar sensor 14 detects a distance between the host vehicle and the three-dimensional object, a relative speed between the host vehicle and the three-dimensional object, a relative position (direction) of the three-dimensional object with respect to the host vehicle, and the like by using radio waves in the millimeter wave band. The radar devices of the radar sensor 14 provide the detected data to the driving support ECU 10 at predetermined times. Incidentally, in lieu of the radar sensor 14, or in addition to the radar sensor 14, LiDAR (Light Detection And Ranging) may be used.

The setting operation device 16 is provided at a position that can be operated by a driver, such as a steering wheel (not shown in FIG. 1), and is operated by the driver. Although not shown in FIG. 1, the setting operation device 16 includes an ACC switching 16A. The driving support ECU 10 executes ACC when ACC is switched on, as will be described further below. The setting operation device 16 may include an operation device for setting the set vehicle speed Vset and the target inter-vehicle distance Dset.

A drive device 22 that accelerates the vehicles 102 by applying a driving force to the driving wheels 24 is connected to the drive ECU 20. The drive ECU 20 normally controls the drive device 22 such that a driving force generated by the drive device 22 changes in accordance with a driving operation by the driver, and controls the drive device 22 based on a command signal when the drive ECU 20 receives the command signal from the driving support ECU 10. Thus, the drive ECU 20 and the drive device 22 cooperate with each other to function as the drive control device 26.

In the embodiment, the drive device 22 includes an engine 28 and a geared automatic transmission 29 that constitute the power train 27. When the drive device 22 is not generating a driving force, the power train generates a decelerating force due to inertia, friction, or the like of the component. In the present application, this deceleration force is referred to as a "power train deceleration force". Note that the drive device 22 may be a so-called hybrid system that is a combination of an engine and an unauthorized transmission, an engine, and a motor, such as a so-called plug-in hybrid system, as long as the power train deceleration force can be generated.

A braking device 32 is connected to the braking ECU 30 to apply a braking force by friction to the wheels 34 and thereby apply a braking force by braking to the vehicles 102 (referred to herein as a "service-braking deceleration force"). The braking ECU 30 controls the braking device so that the braking force generated by the braking device 32 changes in response to a braking operation by the driver in a normal state. Upon receiving the command signal from the driving support ECU 10, the braking ECU 30 performs the automated braking by controlling the braking device 32 based on the command signal.

Thus, the braking ECU 30 and the braking device 32 cooperate with each other to function as an automated braking device 36. When braking force is applied to the wheels by driving control or the like, a brake lamp (not shown in FIG. 1) is turned on.

The meter ECU 40 is connected with a touch panel type display 42 that displays a state of control by the driving support ECU 10 and the like. The display 42 may be, for example, a multi-information display in which meters and various types of information are displayed, or may be a display of the navigation device 70 described later. As described below, the display 42, upon receiving a signal from the driving support ECU 10, displays the status of ACC.

The driving operation sensor 50 and the vehicle-state sensor 60 are also connected to CAN 104. Information (referred to as sensor information) detected by the driving operation sensor 50 and the vehicle-state sensor 60 is transmitted to CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 50 includes a driving operation amount sensor for detecting an operation amount of the accelerator pedal, a braking operation amount sensor for detecting a pedaling force with respect to the master cylinder pressure or the brake pedal, and a brake switch for detecting whether or not the brake pedal is operated. The driving operation sensor 50 includes a shift position sensor for detecting a shift position of the automatic transmission 29, a steering angle sensor for detecting a steering angle, a steering torque sensor for detecting a steering torque, and the like.

The vehicle state sensor 60 includes a vehicle speed sensor that detects the vehicle speed V of the vehicle 102, a longitudinal acceleration sensor that detects the acceleration in the longitudinal direction of the vehicle, a lateral acceleration sensor that detects the acceleration in the lateral direction of the vehicle, a yaw rate sensor that detects the yaw rate of the vehicle, and the like.

In addition, a navigation device 70 is also connected to CAN 104. The navigation device 70 includes a GPS receiver that detects the position of the vehicle 102, a storage device that stores map information and road information, and a communication device that acquires the latest information of the map information and the road information from the outside. In particular, the road information includes information on a position, a range, and a slope of a descending slope.

Figure 2:
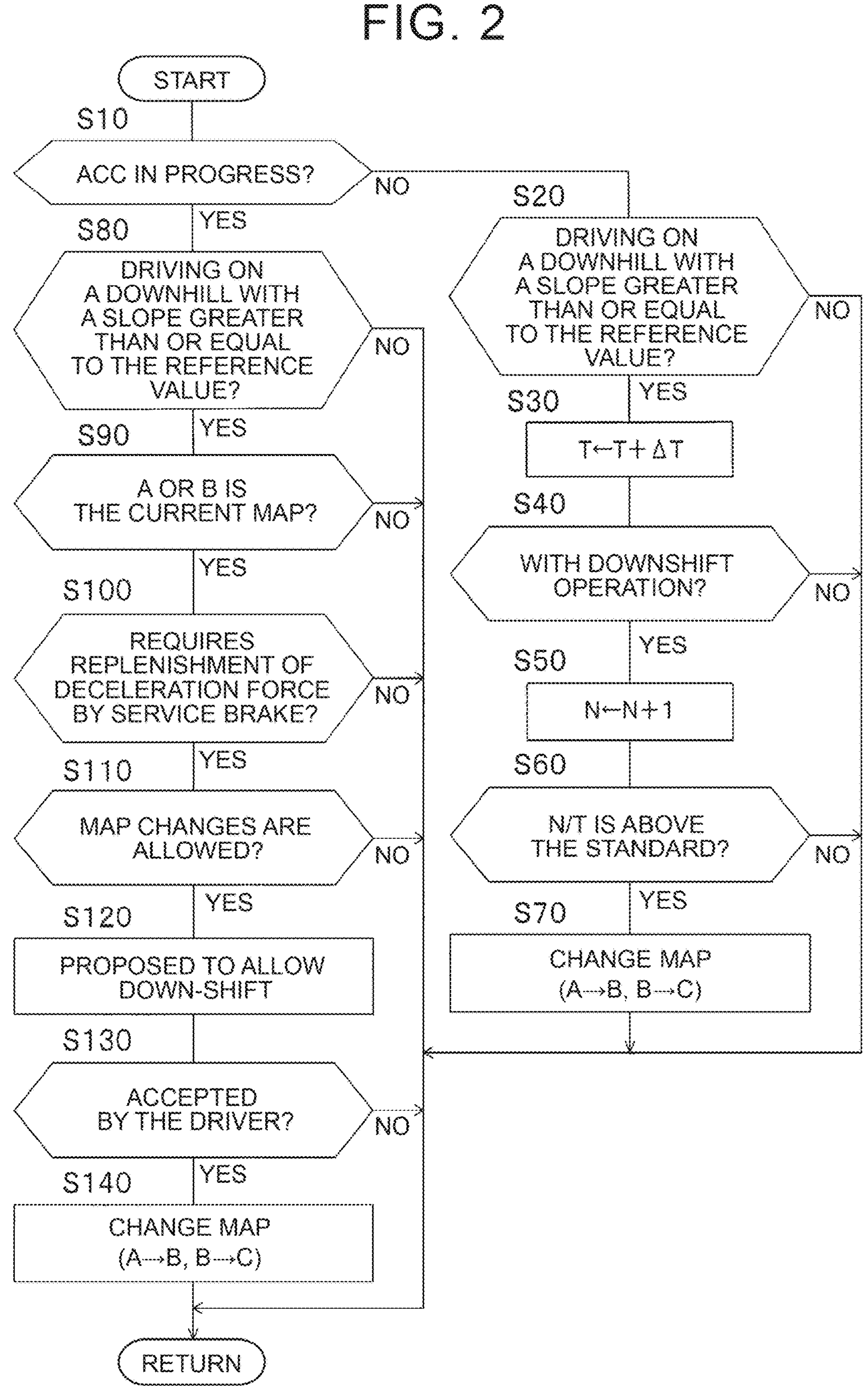
FIG. 2 is a flowchart illustrating a power tray deceleration force upper limit map setting routine according to the embodiment.
Figure 3:
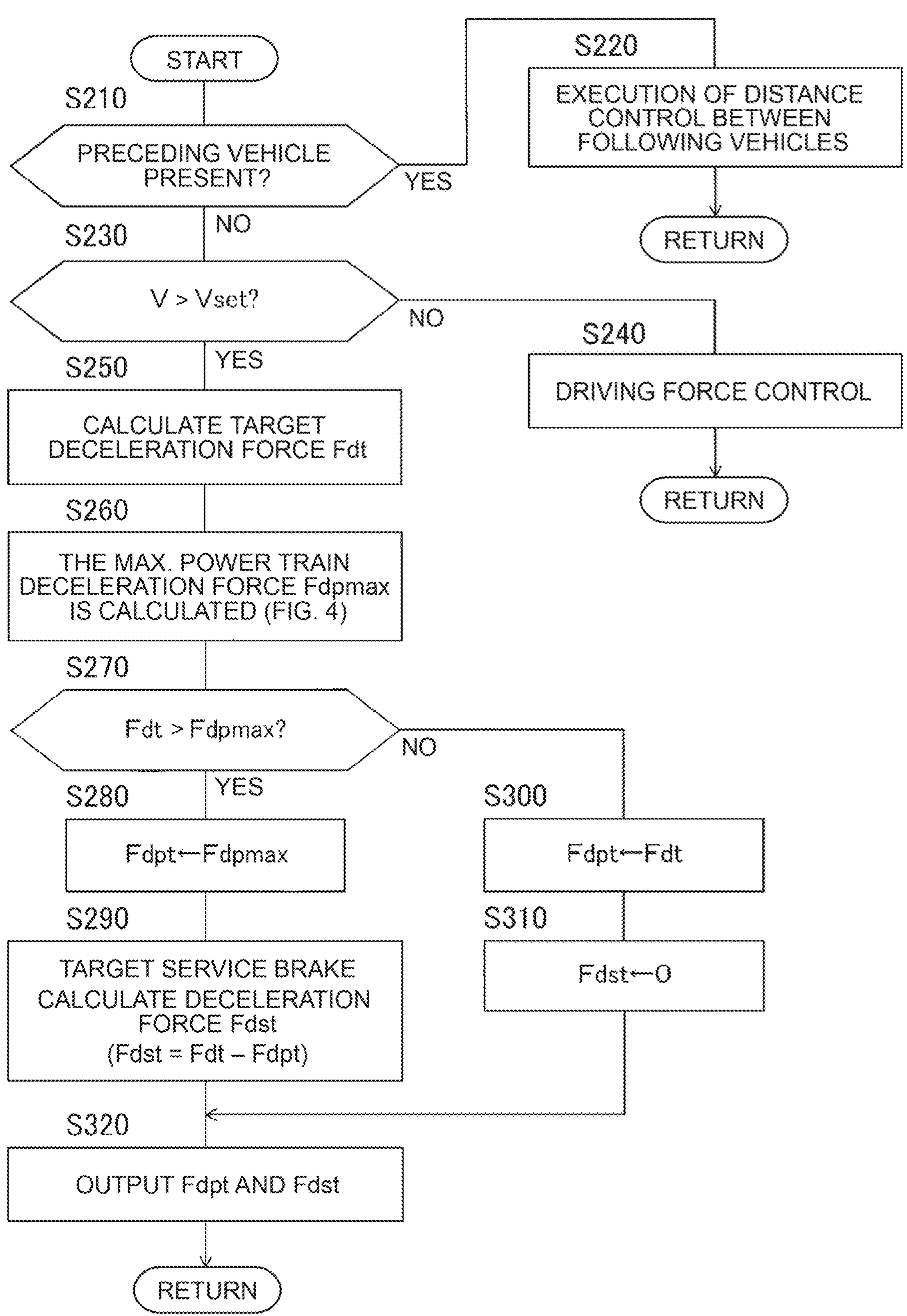
FIG. 3 is a flow chart illustrating an ACC routine according to an embodiment.
Figure 4:
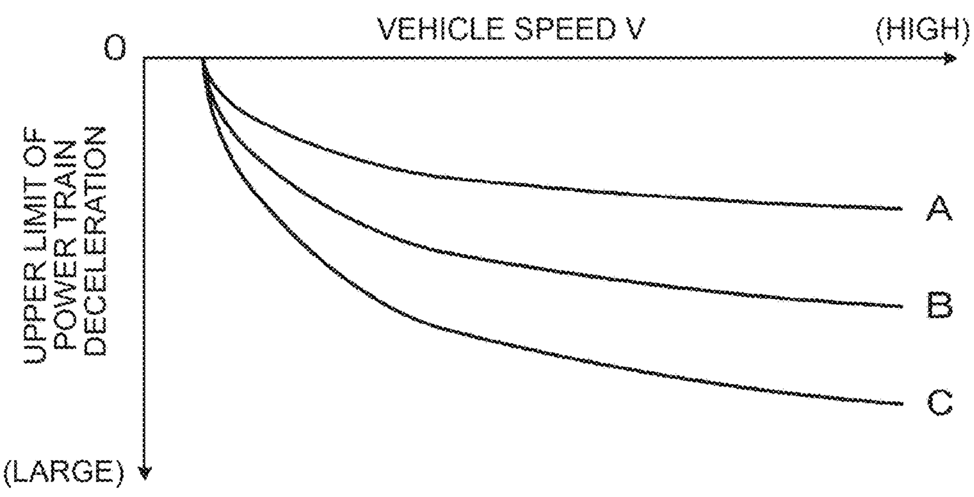
FIG. 4 is a diagram illustrating power train deceleration force upper limit maps A to C, which are relationships between the vehicle speed V and the upper limit value of the power train deceleration force.

In the embodiment, ROM of the driving support ECU 10 stores a power train deceleration force upper limit map setting program corresponding to the flowchart illustrated in FIG. 2 and an ACC program corresponding to the flowchart illustrated in FIG. 3. Further, ROM of the driving support ECU 10 stores the power train deceleration force upper limit maps A to C shown in FIG. 4. As shown in FIG. 4, the maps A to C are set such that the upper limit of the power train deceleration force increases in this order, and the upper limit of the power train deceleration force in each map increases as the vehicle speed V increases. Note that the map A having the smallest upper limit of the power tray deceleration force is set to the standard power tray deceleration force upper limit map.

In the present application, the control mode of the power train deceleration force performed in the situation where the power train deceleration force upper limit map is A to C is referred to as the first to third control modes, respectively. The control mode of the power train deceleration force is set to the first control mode as the basic control mode when the vehicle 102 starts traveling.

Power Train Reduction Force Upper Limit Map Setting Routine (FIG. 2)

Next, a power train deceleration force upper limit map setting routine according to the embodiment will be described with reference to a flowchart shown in FIG. 2. The setting of the power train deceleration force upper limit map according to the flow chart shown in FIG. 2 is repeatedly executed at predetermined intervals by CPU of the driving support ECU 10 in a situation where ACC switching 16A is on.

First, in S10, CPU determines whether or not ACC is being executed. When an affirmative determination is made, the present control proceeds to S30, and when a negative determination is made, the present control proceeds to S20.

In S20, CPU determines whether or not the slope (inclination angle φ) of the descending slope is equal to or greater than a reference value φc (positive constant) while the vehicles 102 are traveling on the descending slope. When a negative determination is made, the present control ends once, and when an affirmative determination is made, the present control proceeds to S30.

In S30, CPU increments the time T during which the vehicles 102 travel on the downhill slope by ΔT. Here, ΔT is the cycle time (positive constant) of the power train deceleration force upper limit map setting routine according to the flowchart shown in FIG. 2.

In S40, CPU determines whether or not a downshift operation has been performed by the driver based on the shift position of the automatic transmission 29 detected by the shift position sensor of the driving operation sensor 50. When a negative determination is made, the present control ends once, and when an affirmative determination is made, the present control proceeds to S50.

In S50, CPU increments the number N of downshift operations by one. In the embodiment, the time T during which the vehicle travels on the downhill road and the number N of downshift operations are cleared when the ignition switch (not shown) is turned off. However, these may be stored in a non-volatile readable/writable storage device and updated each time the vehicle travels on a downhill road.

In S60, CPU determines whether or not the specific N/T of the number N of downshifts relative to the time T during which the vehicles 102 travel on the downhill slope is equal to or greater than the reference value α (positive constant). When a negative determination is made, the present control ends once, and when an affirmative determination is made, the present control proceeds to S70. The specific N/T is a frequency of a downshift operation in a situation where the vehicle travels on a downhill road, and is calculated as an index of the driver's tolerance to an increase in the engine rotational speed due to a downshift when the vehicle travels on a downhill.

In S70, CPU changes the power train deceleration force upper limit map so that the upper limit of the power train deceleration force is one step upper. For example, when the current map is A, the map is changed to B, and when the current map is B, the map is changed to C. Therefore, the basic control mode of the power train deceleration force is set to any one of the first to third control modes in accordance with the frequency of the shift-down operation. When a negative determination is made in S20, S40 or S60, the power tray deceleration force upper limit map is not changed and is maintained in the present map.

In S80, CPU determines whether or not the slope of the descending slope is equal to or greater than the reference value φc while the vehicles 102 are traveling on the descending slope, as in S20. When a negative determination is made, the present control ends once, and when an affirmative determination is made, the present control proceeds to S90. The reference value in determining S80 may be different from the reference value in determining S20.

In S90, CPU determines whether or not the present map is A or B, that is, whether or not the upper limit of the power train deceleration force can be changed in one stage. When a negative determination is made, the present control ends once, and when an affirmative determination is made, the present control proceeds to S100.

In S100, CPU determines whether the service-brake deceleration needs to be replenished. When a negative determination is made, the present control ends once, and when an affirmative determination is made, the present control proceeds to S110. When the target deceleration force Fdt is larger than the maximum power train deceleration force Fdpmax and the determination of S270 is affirmative, it may be determined that the service brake deceleration force needs to be replenished in ACC routine to be described later.

Figure 5:
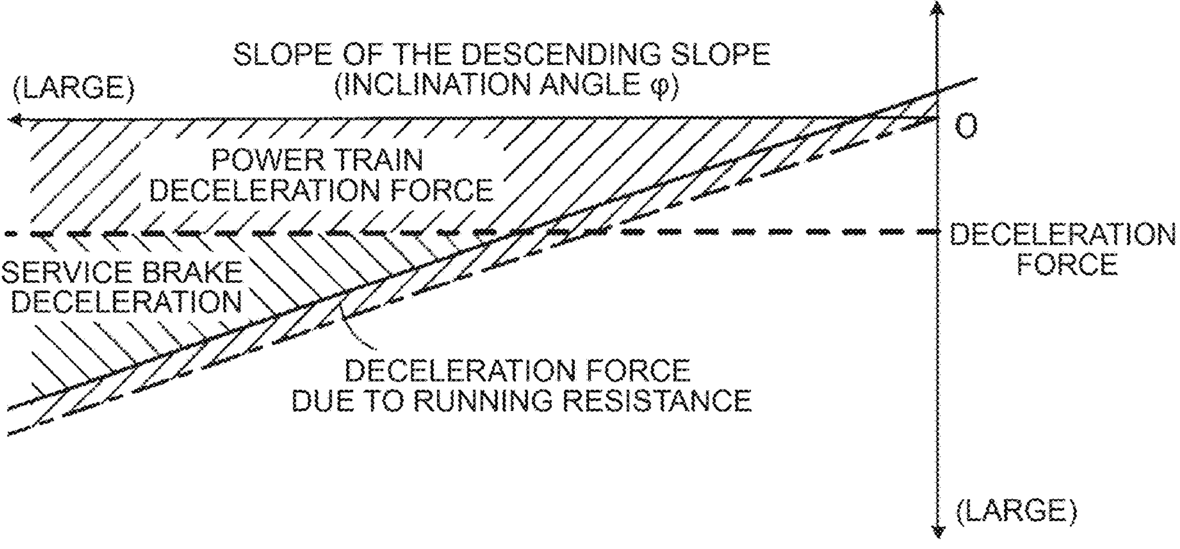
FIG. 5 is a diagram illustrating an exemplary relation between a slope of a descending slope required to maintain a constant vehicle speed and a deceleration force.

FIG. 5 is a diagram illustrating an example of a relationship between a slope (horizontal axis) of a descending slope and a deceleration force (vertical axis) required to maintain a constant vehicle speed. In FIG. 5, a dashed-dotted line indicates a deceleration force Fd required to keep the vehicle speed constant, a solid line indicates a sum of the power train deceleration force Fdp and the service-brake deceleration force Fds, and a broken line indicates an upper limit of the power train deceleration force, which is an upper limit of the power tread deceleration force. The deceleration force between the one-dot chain line and the solid line is a deceleration force caused by the traveling resistance of the vehicle 102. The broken line moves downward in FIG. 5 when the upper limit map of the power train deceleration force is changed so that the upper limit of the power train deceleration force is increased. S100 determination is a determination as to whether or not the inclination angle φ of the downhill slope is larger than the inclination angle of the downhill slope at the intersection of the solid line and the broken line in FIG. 5.

In S110, CPU determines whether or not a change in the upper limit map of the power train deceleration force, in which the upper limit of the power train deceleration force is one step higher, is allowed. This determination is made as to whether or not the upper limit of the power train deceleration force does not exceed the deceleration force (solid line) required in the current gradient even if the upper limit of the power train deceleration force is changed so that the upper limit of the power train deceleration force is at the upper limit of one step. When a negative determination is made, the present control ends once, and when an affirmative determination is made, the present control proceeds to S120. Even if the map in which the upper limit of the power train deceleration force is one step upper is changed, it may be determined that the change of the power train deceleration force upper limit map in which the upper limit of the power train deceleration force is one step upper is allowed when the upper limit of the power train deceleration force does not exceed the target deceleration force Fdt.

In S120, CPU displays, for example, "Allow automatic downshift?", "Yes", and "No" on the display 42 by sending a command signal to the meter ECU 40, and proposes an allowance for downshift.

In S130, CPU determines whether or not the driver has accepted the automatic downshift, for example, by determining whether or not the driver has touched "Yes" on the display 42. When a negative determination is made, the present control ends once, and when an affirmative determination is made, the present control proceeds to S140. In a case where "yes" is not touched within the reference time (positive constant) after the display of the allowable proposal for downshift is started on the display 42, a negative determination may be made.

In S140, CPU changes the power train deceleration force upper limit map so that the upper limit of the power train deceleration force is one step upper, similarly to S70. As a result, the basic control mode of the power train deceleration force is changed in accordance with the change of the map. When a negative determination is made in S80, S90, S100, S110 or S130, the power tray deceleration force upper limit map is not changed and is maintained in the present map.

ACC Routine (FIG. 3)

FIG. 3 is a flow chart of an ACC method according to an embodiment of the present disclosure. ACC according to the flow chart shown in FIG. 3 is repeatedly executed at predetermined intervals by CPU of the driving support ECU 10 in a situation where ACC switching 16A is on.

First, in S210, CPU determines whether or not there is a preceding vehicle in front of the vehicle 102. When a negative determination is made, the present control proceeds to S230, and when an affirmative determination is made, the present control proceeds to S220.

In S220, CPU executes the following inter-vehicle distance control of ACC. That is, CPU controls the traveling of the vehicle 102 with respect to the preceding vehicle so that the inter-vehicle distance D between the vehicle 102 acquired by the target information acquisition device 18 and the preceding vehicle becomes the set target inter-vehicle distance Dset.

In S230, CPU determines whether or not the vehicle speed V exceeds the set vehicle speed Vset of the constant speed travel control of ACC. When an affirmative determination is made, the present control proceeds to S250, and when a negative determination is made, the present control proceeds to S240.

In S240, CPU transmits a command signal to the drive ECU 20 to execute driving force control for controlling the driving force by the drive device 22 so that the vehicle speed V becomes the set vehicle speed Vset.

In S250, CPU calculates a target deceleration force Fdt for bringing the vehicle speed V to the set vehicle speed Vset based on a difference between the vehicle speed V and the set vehicle speed Vset in a manner known in the art.

In S260, CPU calculates the maximum power train deceleration force Fdpmax, which is the upper limit of the power train deceleration force, from the currently set power train deceleration force upper limit map (FIG. 4) based on the vehicle speed V.

In S270, CPU determines whether or not the target deceleration force Fdt is larger than the maximal power train deceleration force Fdpmax, that is, whether or not the deceleration force needs to be replenished by the service-brake deceleration force Fds. When a negative determination is made, the present control proceeds to S300, and when an affirmative determination is made, the present control proceeds to S280.

In S280, CPU sets the target power train deceleration force Fdpt to the maximal power train deceleration force Fdpmax.

In S290, CPU sets the target service-brake deceleration force Fdst to a differential Fdt-Fdpt between the target deceleration force Fdt and the target power train deceleration force Fdpt.

In S300, CPU sets the target power train deceleration force Fdpt to the target deceleration force Fdt, and in S310, CPU sets the target service-brake deceleration force Fdst to 0.

In S320, CPU transmits a signal indicating the target power train deceleration force Fdpt to the drive ECU 20. The drive ECU 20 controls the power train 27 so that the power train deceleration force Fdp becomes the target power train deceleration force Fdpt. When the target power train deceleration force Fdpt is large and the power train deceleration force Fdp cannot be set to the target power train deceleration force Fdpt, automatic downshifting is performed.

Further, in S320, CPU transmits a signal indicating the target service-brake deceleration force Fdst to the braking ECU 30. The braking ECU 30 controls the braking device 32 so that the service-brake deceleration force Fds becomes the target deceleration force Fdst. Therefore, the sum of the power train deceleration force Fdp and the service-brake deceleration force Fds is controlled to be the target deceleration force Fdst.

Modification

Figure 6:
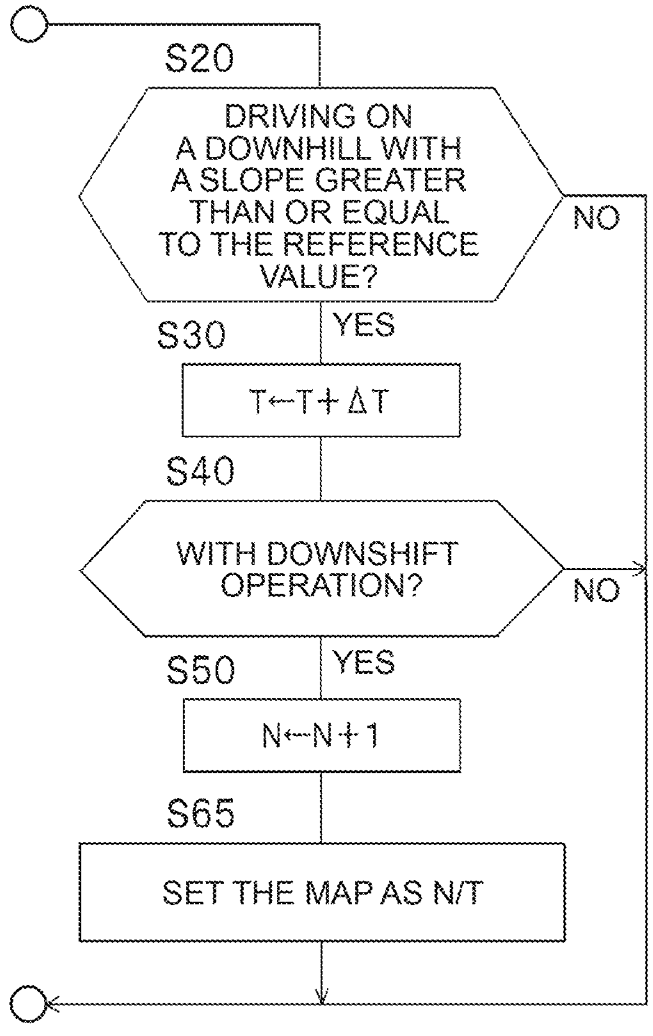
FIG. 6 is a flowchart illustrating a main part of a power train deceleration force upper limit map setting routine according to a modification.

FIG. 6 is a flowchart illustrating a main part of a power train deceleration force upper limit map setting routine according to a modification. As shown in FIG. 6, in a variant, S65 is performed instead of S60 and S70. The other steps of the power train deceleration force upper limit map setting routine and the steps of ACC routine are performed in the same manner as in the embodiment.

In S65, similar to S60, a specific N/T is calculated, which is a frequency of downshifting in a situation where the vehicle travels on a downhill road. Further, when the specific N/T is less than the first reference value $\beta 1$ (positive constant), the power train deceleration force upper limit map is set in the map A. When the specific N/T is greater than or equal to the first reference value $\beta 1$ and less than the second reference value $\beta 2$ (a positive constant greater than the first reference value $\beta 1$), the power tray deceleration force upper limit map is set in the map B. Further, when the specific N/T is equal to or greater than the second reference value $\beta 2$, the power train deceleration force upper limit map is set in the map C.

As can be seen from the above explanation, according to the embodiment and the modification, the specific N/T is calculated as the frequency of the downshift operation in the situation where the vehicles 102 travel on the downhill road (S60 from S20). Then, in the embodiment, when the specific N/T is equal to or larger than the reference value $\alpha$ (positive constant), the power train deceleration force upper limit map is changed so that the upper limit of the power train deceleration force is one step upper (S70). In the modification, the power train deceleration force upper limit map is set in accordance with the ratio N/T so that the upper limit of the power train deceleration force increases as the ratio N/T increases (S65).

The specific N/T indicates the driver's tolerance to an increase in the engine rotational speed due to the downshift when the vehicle travels downhill. Therefore, the ratio is controlled in accordance with the tolerance so that the ratio of the power train deceleration force to the target deceleration force becomes higher as the tolerance becomes higher. Therefore, it is possible to increase the ratio of the power train deceleration force to the target deceleration force in a situation where the driver having a high tolerance is driving while reducing the possibility that the driver having a low tolerance feels uncomfortable due to the increase in vibration and noise caused by the increase in the engine rotational speed.

Further, according to the embodiment, the specific N/T is obtained as the frequency of the downshift by the driver when the vehicle travels downhill without executing the constant speed control, and it is determined that the tolerance is higher when the specific N/T is equal to or larger than the reference value $\alpha$ (S60 from S20). Further, according to the modification, the power train deceleration force upper limit map is set such that the higher the specific N/T, the larger the power train deceleration force upper limit is. Therefore, the driver's tolerance to the increase in the engine rotational speed due to the downshift can be determined based on the specific N/T as the frequency of the downshift.

Further, according to the embodiment and the modification, when it is determined that the present map when the vehicle travels downhill is A or B (S80, S90), a downshift allowance is proposed (S120). Then, it is determined whether or not the driver has accepted the automatic downshift (S130). When it is determined that the driver has accepted the automatic downshift, the upper limit map of the power train deceleration force is changed so that the upper limit of the power train deceleration force is one step higher (S140).

In other words, when the basic control mode when the vehicle travels downhill is not the control mode having the highest ratio among the plurality of control modes, it is determined whether or not the driver permits the downshift. When it is determined that the driver permits the downshift, the basic control mode is changed to a control mode having a higher ratio than the basic control mode.

Therefore, when the basic control mode when the vehicle travels downhill is not the control mode having the highest ratio among the plurality of control modes, it is possible to determine whether or not the driver permits the downshift. Further, when the driver determines that the shift-down is allowed, the basic control mode can be changed to a control mode having a higher ratio than the basic control mode.

Furthermore, according to the embodiment and the variant, it is determined (S100) that a replenishment of the service braking deceleration force is required. Then, when it is determined that the change of the power train deceleration force upper limit map in which the upper limit of the power train deceleration force is one step upper is permitted (S110), the allowance of the shift-down is proposed (S120).

Therefore, it is possible to suppress the driver from being determined whether or not to allow the downshift when the replenishment of the service brake deceleration force is not necessary, or when the change of the basic control mode to the control mode in which the ratio is higher than the basic control mode is not permitted.

While the disclosure has been described in detail in connection with specific embodiments, it will be apparent to those skilled in the art that the disclosure is not limited to the embodiments and variations described above, and that various other embodiments are possible within the scope of the disclosure.

For example, in the above-described embodiment and modification, the display of the driver's tolerance to the increase in the engine rotational speed due to the downshift when the vehicle travels downhill is a specific N/T that is the frequency of the downshift when the vehicle travels on the downhill road. However, the tolerance index may be a specific N/M of the number N of downshifts relative to the number M of downhill travels of the vehicle.

In addition, in the above-described embodiments and modifications, when it is determined that the present map when the vehicle travels downhill is A or B (S80, S90), allowance for downshift is proposed (S120). Then, it is determined whether or not the driver has accepted the automatic downshift (S130). Then, when it is determined that the driver has accepted the automatic downshift, the upper limit map of the power train deceleration force is changed so that the upper limit of the power train deceleration force is one step higher (S140). However, S140 may be omitted from S80.

Further, in the above-described embodiments and modifications, a control mode setter for the driver to set the control mode is not provided. However, a control mode setter may be provided so that the driver can set the basic control mode by operating the control mode setter. In this case, the set basic control mode may be regarded as one of indices of the driver's tolerance to an increase in the engine rotational speed due to the downshift when the vehicle travels downhill.

In the embodiment and the modification described above, the upper limit map of the power tray deceleration force is A to C, and the control mode of the power tray deceleration force is the first to third control modes. However, the number of control modes of the power train deceleration force upper limit map and the power train deceleration force may be other than three.

Further, in the above-described embodiments and modifications, the constant speed control is ACC, but the constant speed control may be any control in which the vehicle speed is controlled to be the target vehicle speed.

What is claimed is:

1. A vehicle driving support device comprising a control unit that executes constant speed control for controlling a vehicle speed such that the vehicle speed is brought to a set vehicle speed, wherein:

the control unit is configured to compute a target deceleration force for bringing the vehicle speed to the set vehicle speed when the vehicle speed is more than the set vehicle speed, and to control a deceleration force such that a sum of a power train deceleration force and a service brake deceleration force is brought to the target deceleration force; and the control unit is configured to determine tolerance of a driver to an increase in engine rotational speed due to a downshift made when a vehicle travels downhill, and to control a ratio of the power train deceleration force to the target deceleration force according to the tolerance such that the ratio is higher as the tolerance is higher.

2. The vehicle driving support device according to claim 1, wherein the control unit is configured to calculate a frequency of downshifts made by the driver when the vehicle travels downhill without executing the constant speed control, and to determine that the tolerance is high when the frequency of the downshifts is equal to or greater than a reference value.

3. The vehicle driving support device according to claim 1, wherein the control unit is configured to have a plurality of control modes in which the ratio of the power train deceleration force to the target deceleration force is different, and to set, as a basic control mode that is used when the vehicle travels downhill, a control mode with a higher ratio as a frequency of downshifts is higher.

4. The vehicle driving support device according to claim 3, wherein the control unit is configured to:

control the power train deceleration force in the control modes in which the ratio of the power train deceleration force to the target deceleration force is different;

determine whether the driver tolerates a downshift when the basic control mode that is used when the vehicle travels downhill is not a control mode with a highest ratio, among the control modes; and change the basic control mode to a control mode with a higher ratio than that in the basic control mode when it is determined that the driver tolerates a downshift.

5. The vehicle driving support device according to claim 4, wherein the control unit is configured to determine whether the driver tolerates a downshift when it is necessary to supplement the service brake deceleration force and it is allowed to change the basic control mode to a control mode with a higher ratio than that in the basic control mode.

* * * * *